United States Patent [19]

Mignot et al.

[11] Patent Number: 4,598,419
[45] Date of Patent: Jul. 1, 1986

[54] AUTOMATIC DEVICE FOR THE STATISTICAL ANALYSIS OF AN OBJECT

[75] Inventors: Jacques Mignot; Patrice Pouyet, both of Paris, France

[73] Assignee: Societe d'Optique, Precision Electronique et Mechanique (SOPELEM), Levallois-Perret, France

[21] Appl. No.: 418,359

[22] Filed: Sep. 15, 1982

[30] Foreign Application Priority Data

Sep. 25, 1981 [FR] France .................. 81 18077

[51] Int. Cl.$^4$ ............................................. G06K 9/00
[52] U.S. Cl. ........................................ 382/6; 382/67
[58] Field of Search .................... 382/51, 65–68, 382/6; 356/39; 358/107; 364/416; 377/10, 11

[56] References Cited

U.S. PATENT DOCUMENTS 4,272,756 6/1981 Kakumoto et al. ............... 382/67

OTHER PUBLICATIONS

Chow et al., "Boundary Extraction Method and Algorithm", *IBM Tech. Disclosure Bulletin*, vol. 14, No. 4, Sep. 1971, pp. 1301–1304.

*Primary Examiner*—Leo H. Boudreau
*Attorney, Agent, or Firm*—Pollock, Vande Sande & Priddy

[57] ABSTRACT

Automatic device for statistical analysis of an object (1), comprising (a) a microscope (4) for projecting the image of an elementary part of the object (1) onto a photoelectric receiver (5), the object (1) and the receiver (5) being displaceable relative to one another, continuously, at constant speed, so that the images of different elementary parts of the object (1) are projected continuously onto the receiver (5); (b) an electronic circuit (7) for continuously digitizing each of the images, followed by a single computer (8) for continuously storing and then for continuously processing these images, making it possible to characterize the latter by a limited number of parameters; and (c) a microprocessor (10) for storage of these parameters and then for statistical calculations by means of all the stored parameters for an average characterization of the object (1) under study.

7 Claims, 7 Drawing Figures

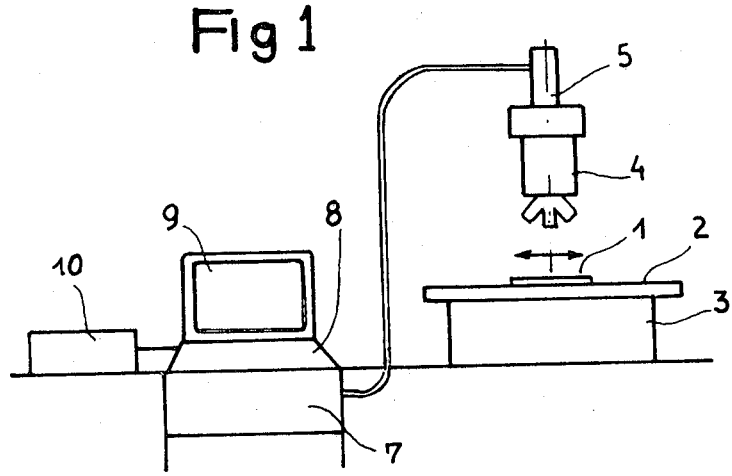
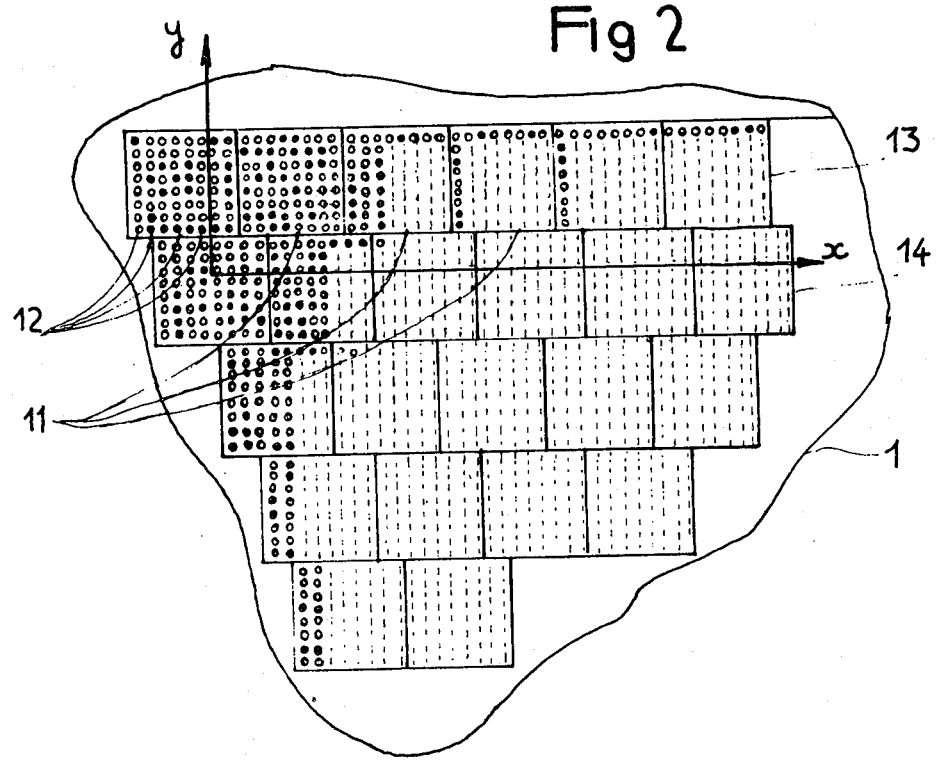

AUTOMATIC DEVICE FOR THE STATISTICAL ANALYSIS OF AN OBJECT

FIELD OF THE INVENTION

The present invention relates to an automatic device for the statistical analysis of an object. It applies, in particular, to the analysis of objects studied under a microscope or of photographs, for example in the fields of medicine, mineralogy or metallurgy. In these fields, a statistical analysis may frequently be sufficient for analyzing an object, in particular its texture; in other words, several different images of this object are studied successively and the results obtained for each image are then averaged.

PRIOR ART

The known image analysis apparatuses study the images individually and produce results on all the elements identified in the images studied. The mathematical algorithms used, which are algorithms of convolutions or of mathematical morphology, work over the whole of the image stored in a reprogrammable read-only memory and convert it to another image stored in a reprogammable read-only memory. Now, the size of electronic memory required to store such images is large. These apparatuses therefore require a large size of electronic memory to store all the images necessary for the analysis of the object, all the more so because this storage is necessary not only before the processing of each image, but also during the processing thereof. Moreover, the algorithms used in these apparatuses are complex: the time required for the processing of each image is consequently fairly long.

In an attempt to overcome these disadvantages, in particular to reduce the size of reprogrammable read-only memory required for the storage of several images, it has already been envisaged to link these memories with a mass memory. However, the operations with the mass memories are very slow compared with the operations in a reprogrammable read-only memory. Consequently, although a reduction in the size of electronic memory is achieved, it is necessary, on the other hand, to increase the time required to analyze the object.

SUMMARY OF THE INVENTION

The invention attempts to overcome these disadvantages. It relates to an analysis device making it possible to process several images consecutively without requiring a large size of reprogrammable read-only memory or a long processing time.

According to the invention, this device comprises:
optical means for projecting the image of an elementary part of the object onto a photoelectric receiver, with means for displacing the object and the said receiver relative to one another, continuously, at constant speed, so that the images of different elementary parts of the object are projected continuously onto the said photoelectric receiver,
electronic means for continuously digitizing each of the said images, followed by a single computer for continuously storing the said images in a reprogrammable read-only memory and for continuously processing these images, making it possible to characterize the latter by a limited number of parameters, and
electronic means for continuous storage of these parameters and then for statistical calculation by means of all the stored parameters for an average characterization of the object studied.

According to a preferred embodiment of the invention, the computer stores a determined number of images of elementary parts before processing the image formed by all these elementary parts, the processing time of the overall image being shorter than the acquisition time in the memory of all the elementary parts of the next overall image.

Preferably, the photoelectric receiver consists of a strip of photodiodes and the displacement of the said strip and the object relative to one another is carried out perpendicular to the axis of the strip. Thus, the image of the elementary part projected continuously onto the strip consists of a column formed of as many points as there are photodiodes in the strip. In a preferred embodiment, the device according to the invention is designed so that the computer stores a number of columns equal to the number of points in each column, so that the overall image processed by the computer is a square.

In this case, each square is preferably processed by dividing the said square successively into equal squares of decreasing size, the number of which increases, for each division, in a geometric progression with a factor of 4 until the number of squares obtained is equal to the number of points in the initial square; for each division, the percentage of squares containing at least one point equal to 1, relative to the total number of squares, is calculated; these percentages represent the characterization parameters of the image formed by the square.

Moreover, the device according to the invention advantageously possesses means for displaying the stored images before they are processed by the computer.

BRIEF DESCRIPTION OF THE DRAWINGS

For a better understanding of the invention, it will now be described in greater detail with reference, by way of example, to a preferred embodiment shown in the attached FIGS. 1 to 5.

FIG. 1 shows a general view of the device according to the invention.

FIG. 2 shows an enlarged detail of the object analyzed in the device of FIG. 1, with the image divided into elementary parts.

As stated above.

DETAILED DESCRIPTION

Figure 3:
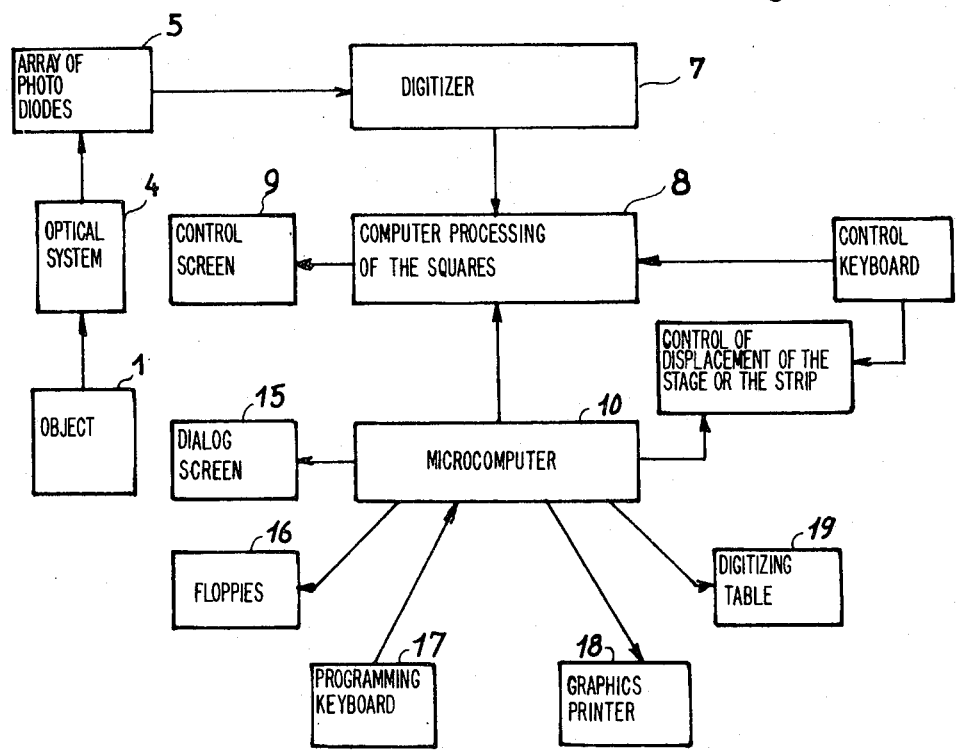
FIG. 3 shows a general diagram of the device of FIG. 1, and in particular the arrangement of the electronic circuits.

Reference will be made first of all to FIG. 1.

FIG. 1 shows a device for the statistical analysis of an object 1 placed on a stage 2 fixed to a base 3. The object 1 can consist of a tissue section, for example, if the field is medicine.

The object 1 passes under a microscope 4 in a continuous linear movement at constant speed. A strip of photodiodes 5, contained in a housing, is fixed to the microscope 4. The microscope 4 thus projects, onto the strip of photodiodes 5, the image of that part of the object 1, subsequently called the "elementary part", which is located under the objective of the microscope 4. Displacement of the object 1 and the microscope 4 relative to one another makes it possible to pass the whole of the object under the objective of the microscope 4. This displacement is carried out perpendicular to the axis of the strip. In FIG. 1, the axis of the strip is perpendicular to the plane of the figure.

Before the analysis, the object 1 to be observed must be treated so that the substance which is more particularly to be analyzed appears with a high contrast relative to the surrounding medium (this contrast being either positive or negative). This can be achieved, for example, by staining the object or by using the versatility of the microscope (differential phase contrast and the like).

The signal produced by the photodiodes, that is to say the image of an elementary part of the object, is digitized by threshold-setting and sampling in an electronic circuit 7 before being stored in a computer 8. The computer 8 also processes the image of this elementary part. This processing starts either immediately or when a determined number of images of elementary parts, forming an overall image, have been stored. The processing time of this overall image is always shorter than the acquisition time in the memory of all the elementary parts of the next overall image. In the same way as the elementary parts are stored continuously, the overall images are therefore also processed continuously.

Means 9 for displaying the images stored in the computer, before they are processed, enable the operator to carry out a real-time check on the digitizing of the image and on the cleanness of the object studied. In the event of a defect in the image, means, which are not shown, are provided for stopping the data processing while at the same time allowing the electronic image to form. Thus, in the case where the image contains an impurity, the operator waits until the impurity has disappeared from the image before restarting the data processing. A camera lucida, which is not shown, also makes it possible to superimpose the electronic image displayed at 9 on the optical image of the object seen in the binoculars: the operator can therefore check the electronic image at any instant, at the same time as the optical image of the object.

In series with the computer 8, there is a microprocessor 10, in which the parameters obtained for each image after the processing of the image by the computer 8 are stored before being used for subsequent statistical calculations when all the parameters of all the processed images have been stored. This processor 10 includes conventional peripherals, which are not shown in FIG. 1.

Reference will now be made to FIG. 2. This figure shows how the object to be studied, 1, is divided into successive images, in this case squares 11, and how each square 11 is divided into elementary parts consisting of columns 12 formed of as many points as there are photodiodes in the strip 5. Each point is coded on a bit (black or white point). In order to identify all the points of the object 1 which have been studied, reference coordinates xOy, attached to the object 1, have been drawn. The axis Oy is parallel to the direction of the photodiodes 5 and the axis Ox is parallel to the direction of displacement of the object 1 and the strip 5 relative to one another. If a column 12 contains n points and the observation of a column 12 is repeated n times, with the object 1 moving forward relative to the strip 5 of photodiodes with a uniform speed along the axis Ox, n columns are recorded and these columns together form a square 11 containing $n^2$ points. Of course, it is necessary to adjust the speed of displacement of the object 1 relative to the strip 5, so that squares and not rectangles are in fact obtained. This speed must also be such that the object to be studied in the eyepiece of the microscope can be observed and such that the acquisition of light by the photodiodes takes place at a rate which leads to a good contrast. When a complete band, such as the band 13, has been scanned, the adjacent band 14 must then be analyzed. The transfer from the band 13 to the band 14 is effected either by intervention of the operator, who moves the object by hand, moves the stage, for example with the aid of a control stick actuating the motors of the stage, or presses a key causing a movement of the stage of the "return carriage" type, or by programming an automatic movement of the stage.

The columns 12 are stored in the computer 8 continuously, without taking account of the division into squares. On the other hand, the processing algorithm is only effected square by square, but of course still continuously, there being no interval of time between the processing of two adjacent squares.

It is quite clear that all the squares shown in FIG. 2 are not simultaneously stored in the computer 8. The computer stores only one square at a time, and as soon as the processing of the square has started, it is no longer necessary to retain its image in the memory; the space is thus free for the next square.

FIG. 3 permits a better understanding of the arrangement of the various elements of the device according to the invention.

This figure shows that the image of the object 1 is projected onto the strip 5 of photodiodes via an optical system, which is a microscope in this particular embodiment 1. The signal produced by the photodiodes is then digitized by sampling and threshold-setting, in a known manner. This digitizing takes place continuously, column by column. After digitizing, each column is stored in the computer 8 while waiting for the number of columns to be sufficient to form a square. When a square is formed, it is processed in the computer. This processing produces a characterization of the image corresponding to a determined number of parameters. These parameters are stored in the microprocessor 10. As soon as the processing of each square has started, the image of this square is no longer stored in the computer; the space is free for all the columns forming the next square.

FIG. 3 shows the checking display screen 9 together with the peripherals of the microprocessor. The latter can in fact be provided, although this is not compulsory, with a dialog screen, a plotting board and floppy discs, and also with a digitizing table. It also comprises a programming keyboard for the statistical calculations to be performed when all the parameters are stored in the microprocessors.

FIG. 3 also shows a control keyboard making it possible to control the displacement of the stage or the strip. It is seen that this displacement can also be controlled by the microprocessor 10 itself. The control keyboard also makes it possible to operate the computer 8 in order to start or stop the processing of the squares.

The processing of the squares is as follows: it consists in dividing each square successively into equal squares of decreasing size, the number of which increases for each division in a geometrical progression with a factor of 4. Thus, the square is divided first into four small squares, each equal to a quarter of the initial square, and each of the four squares obtained is then further divided into four smaller squares; this gives sixteen small squares, each equal to a sixteenth of the initial square. This division is continued until the number of squares obtained is equal to the number of points in the initial square. It is obvious that the side of the square must contain a number of points which is a multiple of 4.

By way of example, if columns formed of 256 points are chosen, eight successive divisions will be made. The number of points in the squares obtained after a first division will be equal to $128^2$. After a second division, the number of points in a square will be equal to $64^2$. On the eighth division, the number of points in a square will be equal to 1.

Figure 4:
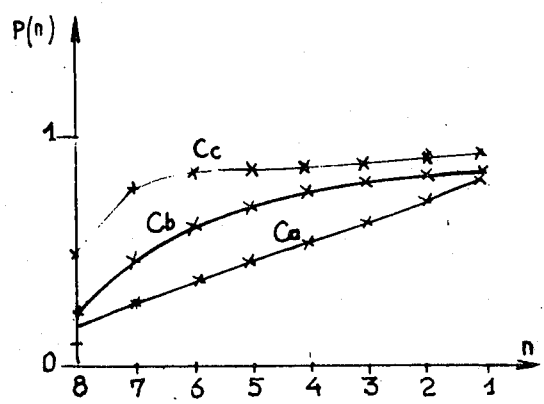
FIG. 4 shows curves for the interpretation of the results obtained by the device of FIG. 1. These curves make it possible to know statistically the appearance of the structure of the object analyzed: the curve Ca corresponds to the sample of FIG. 5a; the curve Cb corresponds to the sample of FIG. 5b; the curve Cc corresponds to the sample of FIG. 5c.
Figure 5A:
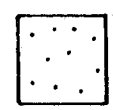
FIGS. 5a, 5b, 5c show samples of objects whose structure corresponds to the curves shown in FIG. 4.
Figure 5B:
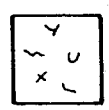
Figure 5C:

For each division, the number of small squares containing at least one point equal to 1, relative to the total number of squares, is counted. A square containing at least one point equal to 1 will be referred to as a "full square". The percentage of full squares relative to the total number of squares, for each division, constitutes one of the parameters which is then stored in the microprocess. In the example given, eight parameters are obtained. These parameters provide statistical knowledge of the structure of the object studied. In fact, FIG. 4 shows that, according to the shape of the curve obtained by plotting on the abscissa the number n of the division formed, this number ranging from 1 to 8, and on the ordinate the percentage p(n) of full squares relative to the total number of squares for each division, it is easily possible to know the general appearance of the structure of the object in question. FIG. 4 shows three different curves, namely the curves Ca, Cb, Cc. The curve Ca corresponds to the texture of the object shown in FIG. 5a, the curve Cb corresponds to the texture of the object of FIG. 5b and the curve Cc corresponds to the texture of the object of FIG. 5c. Of course, a rising curve tending towards 1 is always obtained, since the first four squares obtained after the first division are always full squares in the majority of cases. p(8) indicates the percentage of elementary points equal to 1, relative to the total number of points in the square. p(8) therefore gives an indication of the total surface area of the full squares, i.e., of the points equal to 1. p(7) gives an indication of the perimeter of the arrays of full squares. For example, in FIG. 5c, which contains closed arrays of points equal to 1, the percentage p(7) is high.

In medicine, it is thus possible to analyze a tissue, the full squares corresponding to the fibers of the tissue, in order to classify it or to detect an anomaly in this tissue.

The eight parameters obtained make it possible subsequently to perform a large number of calculations, which it is not necessary to develop here.

The device according to the invention has numerous advantages. It makes it possible to process a large number of images consecutively, without requiring a large size of reprogrammable read-only memory or a long processing time. In fact, the image of a square is only stored for a few moments in the computer and the processing of the image does not require storage of the intermediate images. This processing is moreover very rapid; it lasts only a few seconds. Another advantage of the device according to the invention is the fact that the object is observed continuously and not field by field, even though the data processing is carried out field by field. This results in time saving and improves the precision of the observation, because it is not necessary, for each field, for the operator to center the part of the object to be observed and to focus it. Moreover, the operator does not have to be qualified, since the use of the device requires very few manual interventions.

The analysis of the results obtained by the device according to the invention is very precise. In fact, it is difficult to assess statistical distributions with the naked eye, while the apparatus according to the invention, on the other hand, makes it possible to obtain such an analysis very precisely and very rapidly. In medicine, for example, it is possible to follow the course of a disease with great precision by studying the sections of the diseased tissue by means of the device according to the invention.

Moreover, by producing results in the form of parameters, the device according to the invention provides additional possibilities compared with simple visual analysis. It makes it possible to carry out classifications, curve plots and the like.

Another advantage of the device according to the invention is the fact that it is inexpensive, since it comprises a relatively small amount of equipment, the size of memory used being reduced.

Of course, the invention is not strictly limited to the embodiment which has been described by way of example, but it also covers other embodiments which would only differ therefrom in variants or in the use of equivalent means.

Thus, instead of projecting onto the strip of photodiodes the image of an object observed under a microscope, it is possible to project a photograph by means of an optical device. The invention therefore makes it possible to analyze photographs.

The processing of the images is not necessarily carried out by means of division into squares. Other divisions could be envisaged or, quite simply, each column could even be processed progressively as it enters the memory of the computer.

In the case of division into squares, the processing of these squares can be improved by forming, in particular for the squares of large size, not only adjacent squares but also partially overlapping squares, so as to give, for each square size in question, the greatest possible number of squares capable of being enclosed in the initial square.

To obtain results of even greater precision, it is also possible to analyze the positive and the negative of the image simultaneously. This gives twice as many parameters as in the embodiment given by way of example.

We claim:

1. Automatic system for statistical analysis of an object (1), comprising
   (a) optical means (4) for projecting on a photoelectric receiver (5) images of elementary parts (12) of said object (1), said images themselves consisting of a predetermined number of elementary parts (12), with means of continuous, constant-speed, relative movement between said object (1) and said receiver (5), so that said images of said elementary parts (12) of said object (1) are projected continuously on said photoelectric receiver (5);
   (b) electronic means (7) for continuously digitizing each of said images (12), said image having a plurality of elementary points each of which is coded as a bit;

(c) a computer (8) for continuously storing said images (12), a number of images (12) equal to the number of elementary points of each image (12) forming a set image (11) called a square, and for successive processing of each square (11) consisting in dividing said square (11) into smaller and smaller equal squares the number of which increases, at each division, until a number of squares equal to the number of elementary points in the initial square (11) is obtained, and, at each division, in calculating the percentage of squares containing at least one point equal to 1 relative to the total number of squares, these percentages constituting the parameters for characterizing said square (11); and (d) electronic means (10) for continuously storing said parameters in a memory followed by statistical calculations by means of the set of parameters stored in memory for an average characterization of the object (1) under study.

2. Automatic system according to claim 1, wherein, for first divisions, into squares of large sizes, the initial square (11) is divided not only into adjacent squares but also into partially overlapping squares so as to obtain, for each size of squares, the greatest possible number of squares capable of being included in the initial square (11).

3. Automatic system according to claim 1 or 2, comprising means (9) for visualizing images stored in a memory before they are processed by said computer (8).

4. Automatic system according to claim 1 or 2, wherein the processing of each said square (11) is subordinate to the time for acquiring all of said elementary parts (12) of a succeeding square (11).

5. Automatic system according to claim 1 or 2, wherein said photoelectric receiver (5) consists of a strip (5) of photodiodes and the relative movement between said strip (5) and said object (1) takes place at right angles to the axis of said strip (5), the image of said elementary part (12) projected continuously on said strip (5) consisting of a column (12) formed by as many points as the number of photodiodes in said strip (5).

6. Automatic system according to claim 1 or 2, wherein said optical means (4) comprises a microscope.

7. Automatic system according to claim 1 or 2, consisting in dividing said square (11) into smaller and smaller equal squares the number of which increases at each division by a factor of 4 in geometric progression.

* * * * *